(12) United States Patent
Shoda

(10) Patent No.: US 10,037,136 B2
(45) Date of Patent: Jul. 31, 2018

(54) DISPLAY CONTROLLER THAT CONTROLS DESIGNATION OF POSITION ON A DISPLAY SCREEN, METHOD OF CONTROLLING THE SAME, AND STORAGE MEDIUM

(71) Applicant: CANON KABUSHIKI KAISHA, Tokyo (JP)

(72) Inventor: Ryosuke Shoda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 63 days.

(21) Appl. No.: 15/179,357

(22) Filed: Jun. 10, 2016

(65) Prior Publication Data

US 2016/0364073 A1 Dec. 15, 2016

(30) Foreign Application Priority Data

Jun. 12, 2015 (JP) .................................. 2015-119067

(51) Int. Cl.
*G06F 3/041* (2006.01)
*G06F 3/0488* (2013.01)
*G06F 3/0481* (2013.01)

(52) U.S. Cl.
CPC ........ *G06F 3/0488* (2013.01); *G06F 3/04812* (2013.01); *G06F 2203/04806* (2013.01); *H04N 2201/0084* (2013.01)

(58) Field of Classification Search
CPC .................................................. G06F 3/0488
USPC ...................................................... 345/173
See application file for complete search history.

(56) References Cited

U.S. PATENT DOCUMENTS

| 2011/0115805 | A1* | 5/2011 | Ahn ..................... | G09B 29/106 345/581 |
| 2012/0159608 | A1* | 6/2012 | Griffin ..................... | G09C 5/00 726/16 |
| 2014/0215387 | A1* | 7/2014 | Kuscher .............. | G06F 3/04845 715/800 |
| 2015/0033125 | A1* | 1/2015 | Kang .................... | G06F 3/0485 715/719 |

FOREIGN PATENT DOCUMENTS

| JP | 2008-226101 A | 9/2008 |
| JP | 2009-193423 A | 8/2009 |

* cited by examiner

*Primary Examiner* — Long D Pham
(74) *Attorney, Agent, or Firm* — Cowan, Liebowitz & Latman, P.C.

(57) ABSTRACT

A display controller enables more easy and accurate operation for designating a position on a displayed position designation target regardless of the size of the position designation target. A grid as the position designation target and a marker that designates a position on the grid are displayed. If a display size of the grid is equal to or larger than a predetermined size, when a touch operation is received, the marker is moved based on the touch position while fixing the display position of the grid, whereas in a case where the display size of the grid is smaller than the predetermined size, when a touch operation is received, the grid is moved based on the touch position while fixing the display position of the marker. A value corresponding to the position of the moved marker is set as a setting value.

16 Claims, 7 Drawing Sheets

DISPLAY CONTROLLER THAT CONTROLS DESIGNATION OF POSITION ON A DISPLAY SCREEN, METHOD OF CONTROLLING THE SAME, AND STORAGE MEDIUM

BACKGROUND OF THE INVENTION

Field of the Invention

The present invention relates to a display controller that controls designation of a position on a display screen, a method of controlling the same, and a storage medium, and more particularly to an operation method used in designating a position on a position designation target using a pointing device.

Description of the Related Art

In recent years, an electronic apparatus provided with a touch panel, such as a digital camera or a mobile phone, has come into wide spread use. On such an electronic apparatus, a user performs various operations by touching a screen.

Incidentally, there has been proposed an electronic apparatus configured to enable a user to select a touch position from a display object, such as a grid (cells), of which the size can be changed using an indicator. In this case, the display object is sometimes too small compared with the size of a finger, depending on the size and state of the display object. Under such a situation, it is difficult for a user to select a desired position by one touch operation. Therefore, the user is required to perform a troublesome operation of fine adjustment for moving to the desired position after performing the touch operation.

To avoid this troublesome operation, there has been proposed an input device for an electronic apparatus, which is configured to display a virtual stylus as a pointer for performing designation input to a display object so as to make it possible to select a desired position thereon when the display object to be operated is too small for a finger (see Japanese Patent Laid-Open Publication No. 2009-193423).

Further, there has been proposed a device configured to fixedly display a pointer when a user performs an input operation using a touch panel (see Japanese Patent Laid-Open Publication No. 2008-226101). In this method, according to a scrolling direction, selection point candidates set in advance as candidates of a user selection point to be selected on a map which is a background are searched for. Then, the map is scrolled in a direction of drawing the closest one of the selection point candidates toward the pointer.

However, in the method described in Japanese Patent Laid-Open Publication No. 2009-193423, the user is required to perform an indirect operation using the pointer. Therefore, the user has a difficulty in performing an intuitive operation, and this indirect operation is troublesome e.g. in a case where the user desires to immediately change a setting.

Further, the method described in Japanese Patent Laid-Open Publication No. 2008-226101 does not take into consideration a case where the display object is enlarged e.g. by a pinch-out operation, whereby the display object is made sufficiently large for a finger. Therefore, the method makes the operation troublesome, in a case where the user desires to select a position by directly touching the position.

SUMMARY OF THE INVENTION

The present invention provides a display controller that makes it possible to more easily and accurately perform an operation for designating a position on a position designation target regardless of the size of a display object as the position designation target, a method of controlling the same, and a storage medium.

In a first aspect of the present invention, there is provided a display controller comprising a reception unit configured to receive an input of a position to a display screen, a control unit configured to cause a position designation target and a marker that designates a position on the position designation target to be displayed on the display screen, a position change unit configured to, in a case where a display size of the position designation target is equal to or larger than a predetermined size, when the input of the position to the display screen is received by the reception unit, change a display position of the marker according to the input of the position, in a state in which a display position of the position designation target is fixed, and in a case where the display size of the position designation target is smaller than the predetermined size, when the input of the position to the display screen is received by the reception unit, change the display position of the position designation target according to the input of the position, in a state in which a display position of the marker is fixed, and a processing unit configured to perform processing corresponding to the position of the marker with respect to the position designation target, which has been changed by the position change unit.

In a second aspect of the present invention, there is provided a display controller comprising a reception unit configured to receive an input of a position to a display screen, a control unit configured to cause a position designation target and a marker that designates a position on the position designation target to be displayed on the display screen, a position change unit configured to, in a case where a state of the input of the position received by the reception unit is a predetermined state, change a display position of the marker according to the input of the position, in a state in which a display position of the position designation target is fixed, and in a case where the state of the input of the position received by the reception unit is not the predetermined state, change the display position of the position designation target according to the input of the position, in a state in which a display position of the marker is fixed, and a processing unit configured to perform processing corresponding to the position of the marker with respect to the position designation target, which has been changed by the position change unit.

In a third aspect of the present invention, there is provided a method of controlling a display controller that causes a position designation target and a marker that designates a position on the position designation target to be displayed on a display screen, comprising receiving an input of a position to the display screen, causing the position designation target and the marker to be displayed on the display screen, changing, in a case where a display size of the position designation target is equal to or larger than a predetermined size, when the input of the position to the display screen is received by said receiving, a display position of the marker according to the input of the position, in a state in which a display position of the position designation target is fixed, and in a case where the display size of the position designation target is smaller than the predetermined size, when the input of the position to the display screen is received by said receiving, the display position of the position designation target according to the input of the position, in a state in which a display position of the marker is fixed, and performing processing corresponding to the position of the marker with respect to the position designation target, which has been changed by said changing.

In a fourth aspect of the present invention, there is provided a non-transitory computer-readable storage medium storing a computer-executable program for causing a computer to execute a method of controlling a display controller that causes a position designation target and a marker that designates a position on the position designation target to be displayed on a display screen, wherein the method comprises receiving an input of a position to the display screen, causing the position designation target and the marker to be displayed on the display screen, changing, in a case where a display size of the position designation target is equal to or larger than a predetermined size, when the input of the position to the display screen is received by said receiving, a display position of the marker according to the input of the position, in a state in which a display position of the position designation target is fixed, and in a case where the display size of the position designation target is smaller than the predetermined size, when the input of the position to the display screen is received by said receiving, the display position of the position designation target according to the input of the position, in a state in which a display position of the marker is fixed, and performing processing corresponding to the position of the marker with respect to the position designation target, which has been changed by said changing.

According to the present invention, it is possible to more easily and accurately perform the operation for designating a position on the position designation target regardless of the size of the display object as the position designation target.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1:
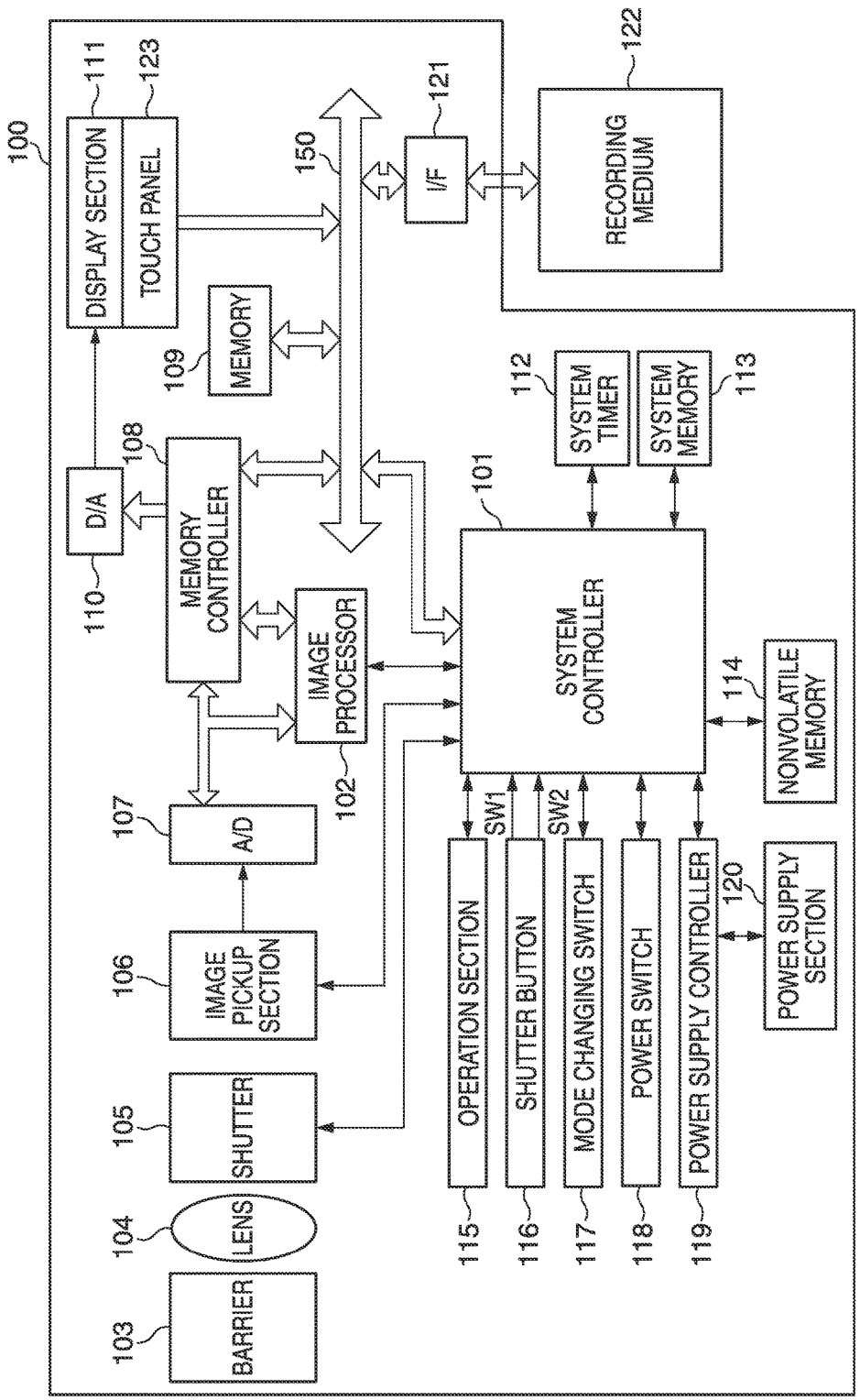
FIG. 1 is a block diagram of a digital camera (hereafter referred to as the camera) as an image pickup apparatus including a display controller according to a first embodiment of the present invention.

FIG. 1 is a block diagram of an image pickup apparatus including a display controller according to a first embodiment of the present invention.

The illustrated image pickup apparatus is e.g. a digital camera (hereinafter simply referred to as "the camera") 100, and the camera 100 is provided with a photographic lens unit (hereinafter simply referred to as the "photographic lens") 104. The photographic lens 104 includes at least a zoom lens and a focus lens.

A shutter 105 having an aperture function is disposed downstream of the photographic lens 104. An image pickup section 106 having an image pickup device, such as a CCD or CMOS sensor, which converts an optical image (object image) to electric signals (analog signals), is disposed behind the shutter 105. The analog signals as an output from the image pickup section 106 are converted to digital signals (image data) by an analog-to-digital converter 107.

Note that a barrier 103 is disposed on a front side of the photographic lens 104. The barrier 103 is used for covering the photographic lens 104, the shutter 105, and the image pickup section 106, to thereby prevent them from being soiled or damaged.

An image processor 102 receives image data as an output from the analog-to-digital converter 107, or image data from a memory controller 108, and performs resizing, such as predetermined pixel interpolation and reduction, and color conversion, on the received image data. Further, the image processor 102 performs predetermined calculation processing using the image data obtained by image pickup.

A system controller 101 performs exposure control and distance measurement control based on the calculation results obtained by predetermined calculation processing performed by the image processor 102. By performing the above-mentioned controls, AF (Automatic Focus) processing by the TTL (Through The Lens) method, AE (Automatic Exposure) processing, and EF (Electronic Flash pre-emission) processing are performed.

Further, the image processor 102 performs predetermined calculation processing using image data obtained by image pickup, and performs AWB (Auto White Balance) processing by the TTL method based on the calculation result.

The image data as an output from the analog-to-digital converter 107 is written into a memory 109 via the image processor 102 and the memory controller 108, or directly via the memory controller 108. The memory 109 has a sufficient storage capacity to store a predetermined number of still images, or a predetermined duration of a moving image and voice data.

The illustrated memory 109 also serves as an image display memory (video memory). Image data to be displayed, which has been written into the memory 109, is given from the memory controller 108 to a display section 111 via a digital-to-analog converter 110 so as to be displayed as an image.

Note that the display section 111 is implemented by an LCD, for example. Further, by converting image data accumulated in the memory 109 to analog signals using the digital-to-analog converter 110, and sequentially transferring the analog signals to the display section 111 for display, it is possible to cause the display section 111 to function as an electronic viewfinder, thereby making it possible to perform through image display (live view display).

The system controller 101 controls the overall operation of the camera 100. A nonvolatile memory 114 is an electrically erasable and recordable memory, and e.g. an EEPROM is used as the nonvolatile memory 114. The nonvolatile memory 114 stores constants, variables, programs, etc., used for the operation of the system controller 101. The programs include programs for executing various processes, described hereinafter.

A system memory 113 is formed e.g. by a RAM. The system controller 101 reads out constants, variables, programs, etc., from the nonvolatile memory 114, and loads them into the system memory 113.

Note that image data written into the memory 109 is formed into a file by the system controller 101, and is recorded in a recording medium 122 via a recording medium interface 121. Further, the system controller 101 performs display control by controlling the memory 109, the digital-to-analog converter 110, the display section 111, and so forth.

A system timer 112 is connected to the system controller 101. The system timer 112 counts times used in various controls by the system controller 101, and notifies the system controller 101 of the times.

A mode changing switch 117 switches the operation mode of the system controller 101 to one of a still image-recording mode, a moving image-recording mode, a reproduction mode, and so forth.

Examples of the still image-recording mode include an automatic photographing mode, an automatic scene determination mode, a manual mode, various scene modes configured for respective photographic scene types, a program AE mode, and a custom mode. By operating the mode changing switch 117, it is possible to directly change the mode to one of these modes.

Further, after temporarily changing the mode to the still image-recording mode by operating the mode changing switch 117, the mode may be changed to one of the above-mentioned modes included in the still image-recording mode, using e.g. an operation section 115. Similarly, the moving image-recording mode includes a plurality of modes.

When a shutter button 116 is operated halfway (half pressed: photographing preparation instruction), a first shutter switch (not shown) is turned on, whereby a first shutter switch signal SW1 is delivered to the system controller 101.

Upon receipt of the first shutter switch signal SW1, the system controller 101 starts photographing preparation operations, such as AF (Auto Focus) processing, AE (Auto Exposure) processing, AWB (Auto White Balance) processing, EF (Electronic Flash pre-emission) processing, and so forth.

When the operation of pressing the shutter button 116 is completed (the shutter button 116 is fully pressed), a second shutter switch (not shown) is turned on, whereby a second shutter switch signal SW2 is delivered to the system controller 101. Upon receipt of the second shutter switch signal SW2, the system controller 101 starts a series of image pickup operations from reading of signals output from the image pickup section 106 to writing of image data in the recording medium 122.

Functions are suitably assigned to various function icons displayed on the display section 111, on a scene (photographing scene)-by-scene basis, and when one of the function icons is selected and operated, the operation section 115 acts as various function buttons. Examples of the function buttons include a stop button, a return button, an image scroll button, a jump button, a narrow-down button, and an attribute change button.

When a menu button is operated on the operation section 115, the system controller 101 displays a menu screen for use in configuring various settings on the display section 111. The user can intuitively configure various settings, using a four-direction button or a set button while viewing the menu screen displayed on the display section 111.

A power switch 118 is connected to the system controller 101 and is used for powering on or off the camera 100 via the system controller 101. A power supply controller 119 is comprised of a battery detection circuit, a DC-to-DC converter, and a switching circuit for switching between blocks to be energized. The power supply controller 119 detects whether or not a battery is mounted thereon, a type of the battery, and a remaining charge amount of the battery. Further, the power supply controller 119 controls the DC-to-DC converter based on the detection results and an instruction from the system controller 101, to thereby apply predetermined voltage to the sections of the camera 100 including the recording medium 122 for a required time period.

A power supply section 120 is connected to the power supply controller 119. The power supply section 120 includes a primary battery, such as an alkaline battery or a lithium battery, or a secondary battery, such as a NiCd battery, a NiMH battery, or a Li battery, and an AC adapter.

The recording medium interface 121 provides an interface between the camera 100 and the recording medium 122, such as a memory card or a hard disk. The recording medium 122 records image data obtained through photographing. The recording medium 122 is implemented by a semiconductor memory or a magnetic disk.

Incidentally, the camera 100 is provided with a touch panel 123 that is capable of detecting a contact on the display section 111 and forms part of the operation section 115, though shown separately in FIG. 1. Further, the touch panel 123 and the display section 111 can be integrally formed, as shown in FIG. 1.

For example, the touch panel 123 is formed such that transmission of light therethrough is not reduced, and is mounted on an upper layer (surface layer) of a display screen of the display section 111. Then, an coordinate input system on the touch panel 123 is associated with a display coordinate system of the display section 111. This makes it possible to form a graphic user interface (GUI) which enables a user to perform an operation on the display section 111 in a manner as if the user can directly operate a screen displayed on the display section 111.

The system controller 101 detects (i.e. receives) the following operations performed on the touch panel 123: a touch-down operation in which the touch panel 123 is touched with a finger or a pen, a touch-on operation in which touching of the touch panel 123 with the finger or the pen is continued, a touch-move operation in which the finger or the pen in a state touching the touch panel 123 is moved, a touch-up operation in which the finger or the pen touching the touch panel 123 is removed from the same, and a touch-off operation in which a state of the touch panel 123 being not touched by anything is continued.

When a touch-down operation is detected, a touch-on operation is simultaneously detected. After the touch-down operation is detected, unless a touch-up operation is detected, the touch-on operation usually continues to be detected. A touch-move operation is detected from a state in which the touch-on operation is detected. Further, even when the touch-on operation is detected, the touch-move operation is not detected unless the touch position is not moved. If the touch-up operation of the finger or the pen which has been touching the touch panel 123 is detected, the touch-off operation results.

Each of the above-mentioned touch operations and coordinates of a position on the touch panel 123 being touched with the finger or the pen (hereinafter collectively referred to as the position information) are notified to the system controller 101 via an internal bus 150. The system controller 101 determines based on the notified position information what operation has been performed on the touch panel 123.

As for the touch-move operation, the system controller 101 determines, based on changes in the coordinates of the position, a direction of movement of the finger or the pen that moves on the touch panel 123, for each vertical component and each horizontal component of the movement on the touch panel 123. Further, when the user has performed a touch-up operation after performing a touch-move operation over a certain distance from the touch-down operation, this touch operation is referred to as "drawing of a stroke".

An operation of quickly drawing a stroke is referred to as a flick operation. The flick operation is an operation of quickly moving a finger or a pen over a certain distance while touching the touch panel 123 and then removing the finger or the pen from the touch panel 123. In other words, the flick operation is an operation of quickly swiping the touch panel 123 in a manner flicking the touch panel 123.

When the system controller 101 detects the touch-move operation performed over a predetermined distance or more at a predetermined speed or higher and then detects the touch-up operation, the system controller 101 determines that the flick operation has been performed. Further, when the system controller 101 detects the touch-move operation performed by a predetermined distance or more at a speed lower than the predetermined speed, the system controller 101 determines that a drag operation has been performed.

A pinch-out operation is an operation that the user touches the touch panel 123 with e.g. two fingers at the same time, and opens the two fingers while touching the touch panel 123. Further, a pinch-in operation is an operation that the user touches the touch panel 123 with e.g. two fingers at the same time, and closes the two fingers while touching the touch panel 123.

As the touch panel 123, for example, there is used one of touch panels based on a resistance film method, an electrostatic capacity method, a surface acoustic wave method, an infrared method, an electromagnetic induction method, an image recognition method, and an optical sensor method.

Figure 2A:
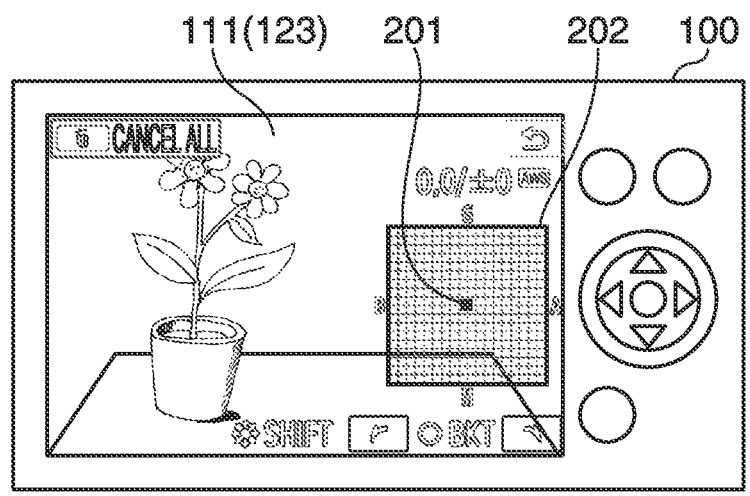
FIG. 2A is a diagram useful in explaining display on a display section of the camera shown in FIG. 1, as viewed from the rear.
Figure 2B:
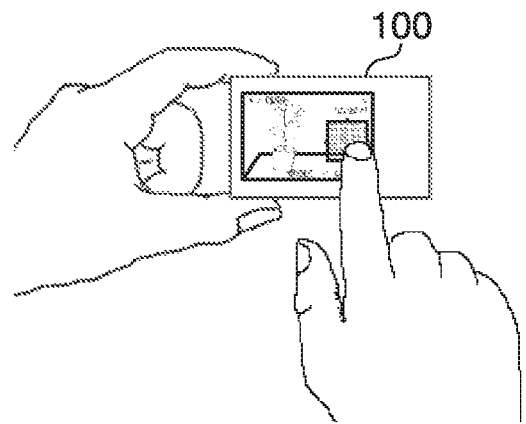
FIG. 2B is a diagram showing a touch operation on the display section of the camera.

FIGS. 2A and 2B are diagrams useful in explaining display on the display section of the camera 100 shown in FIG. 1, in which FIG. 2A shows the camera 100 as viewed from the rear, and FIG. 2B shows a touch operation.

As shown in FIG. 2A, the display section 111 is provided on the rear side of the camera 100, and the touch panel 123 is integrally laminated on the surface of the display section 111. The through image data and image data recorded in the recording medium 122 are displayed on the display section 111, as described above, as reproduced images. Further, buttons to which predetermined functions are assigned, respectively, and a grid 202 in the form of cells are displayed on an image displayed on the display section 111.

A marker 201 (also referred to as the indicator or the pointer) is displayed on the grid 202 in a superimposed manner. The system controller 101 performs processing corresponding to a position indicated by the marker 201 on the grid 202. That is, the grid 202 is a display object which is a position designation target on which the position of the marker 201 is designated by a touch operation. The grid 202 displayed as the display object on the camera 100 is a white balance shift setting screen, by way of example.

On the white balance shift setting screen shown in FIG. 2A, the position of the marker 201 on the grid 202 is designated by a touch operation with respect to the two axes of B (blue) and A (amber), and M (magenta) and G (green). This sets a white balance setting value (white balance shift value) corresponding to the position of the marker 201 on the grid 202.

For example, when the marker 201 is moved from the center position of the grid 202 to a position shifted by two increments in the left direction and three increments in the upper direction along the scales of the grid 202, a white balance setting value corresponding to "3" in an A direction and "2" in a G direction are set. Note that the marker 201 is always displayed in a manner superimposed on the grid 202 regardless of the size of the grid 202.

As shown in FIG. 2B, when the user touches the touch panel 213, if the display size of the grid 202 is small for the user's finger, it is difficult for the user to designate an intended position. In this case, the user adjusts the size (display size) of the grid 202 by a pinch-out operation.

Figure 3A:
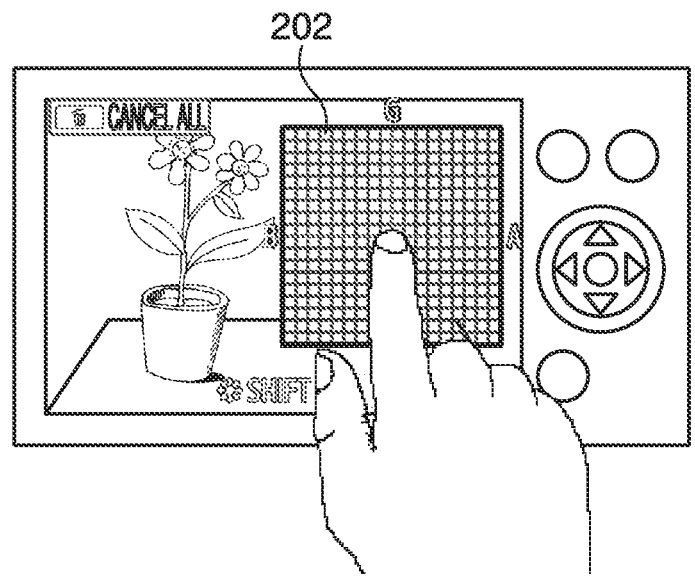
FIG. 3A is a diagram showing a grid after adjusting the display size of the grid by performing a pinch-out operation on the display section, appearing in FIG. 2A, of the camera.
Figure 3B:
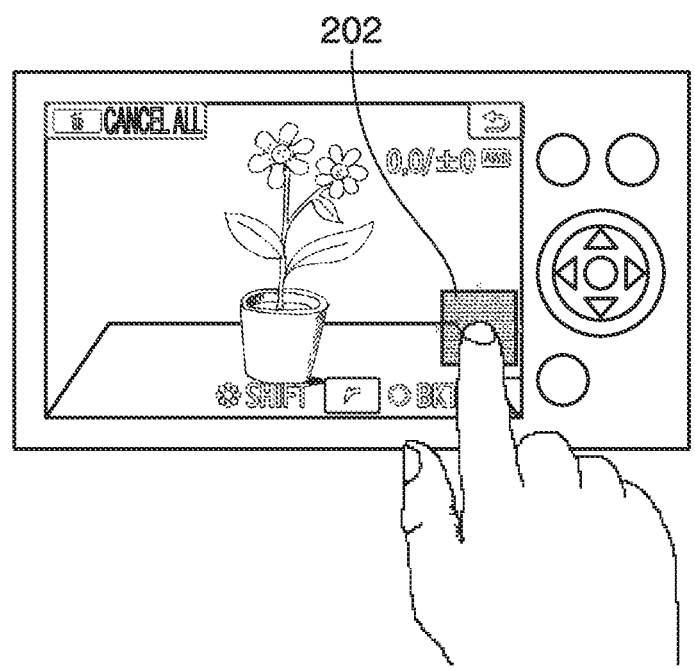
FIG. 3B is a diagram showing the grid after adjusting the display size of the grid by performing a pinch-in operation on the display section.

FIGS. 3A and 3B are diagrams useful in explaining the grid 202 after adjusting the display size of the grid 202 appearing in FIGS. 2A and 2B, in which FIG. 3A shows the grid 202 after performing a pinch-out operation, and FIG. 3B shows the grid 202 after performing a pinch-in operation.

When the user performs a pinch-out operation using his/her fingers, the system controller 101 enlarges the grid 202 and displays the same on the display section 111 in an enlarged state, as shown in FIG. 3A. Examples of the case where the grid 202 is enlarged include a case where the user places importance on the configuration of the setting, and a case where an object is at an end of the screen and hence the grid 202 does not interfere with photographing even when the grid 202 is enlarged.

When the user performs a pinch-in operation using his/her fingers, the system controller 101 reduces the size of the grid 202 and displays the grid 202 on the display section 111 in a reduced state, as shown in FIG. 3B. Examples of the case where the grid 202 is reduced include a case where the user places importance on the confirmation of an object, i.e. a case where the user desires to increase a range in which the object can be viewed by reducing the size of the grid 202.

Figure 4:
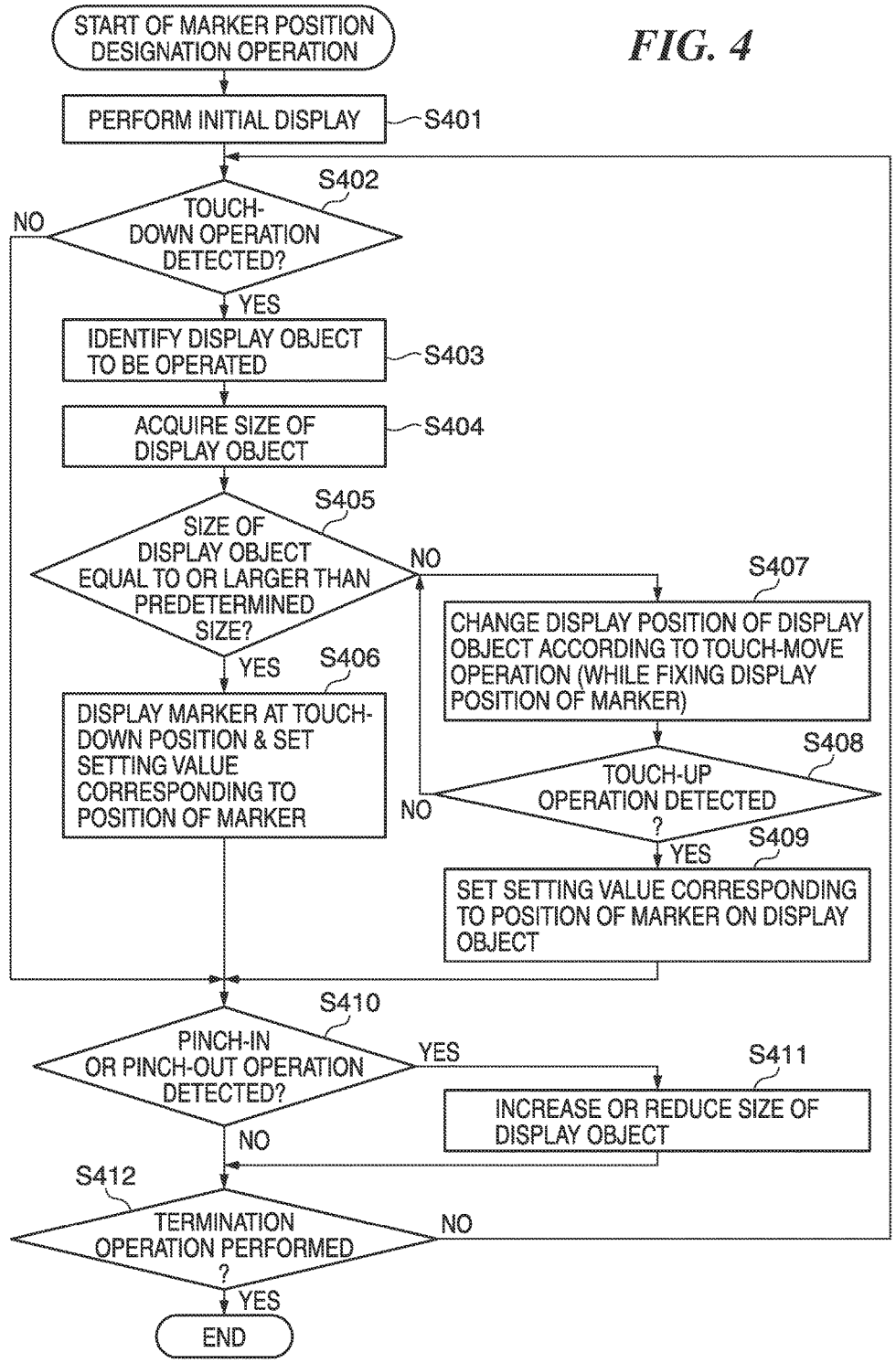
FIG. 4 is a flowchart of a marker position designation operation process for designating a position of a marker on the grid displayed on the display section of the camera.

FIG. 4 is a flowchart of a marker position designation operation process for designating a position of the marker 201 on the grid 202 displayed on the display section 111 of the camera 100 shown in FIG. 1.

Here, the description will be given, by taking the white balance setting as an example, of a case where the movement of the grid 202 and the movement of the marker 201 are selectively performed by a touch operation in a manner switched therebetween depending on the size of the grid 202. The marker position designation operation process shown in FIG. 4 is performed by the system controller 101 that loads a program recorded in the nonvolatile memory 114 into the system memory 113 and executes the loaded program.

When the user starts the camera 100 in the photographing mode and performs an operation for causing the white balance setting screen to be displayed on the display section 111, the system controller 101 starts the marker position designation operation process in FIG. 4.

The system controller 101 displays the grid 202 and the marker 201 associated with the white balance setting in a manner superimposed on a live view image (through image) (step S401: initial display). At this time, the system controller 101 determines the position of the marker 201 with respect to the grid 202 according to the current white balance setting value. Further, the system controller 101 determines a display size set when the grid 202 was displayed last time as the display size of the grid 202. The grid 202 and the marker 201 are displayed, for example, as shown in FIG. 2A by executing the step S401.

Then, the system controller 101 determines whether or not a touch-down operation performed on the touch panel 123 is detected (step S402). If a touch-down operation is detected (YES to the step S402), the system controller 101 identifies a display object to be operated, based on a touch position at which the touch-down operation has been performed (step S403).

Note that if the user has touched a position of an icon unrelated to the grid 202 and the marker 201, the system controller 101 performs processing corresponding to the icon. In the following description, it is assumed that the user has touched the grid 202, and the display object to be operated is the grid 202 or the marker 201.

Next, the system controller 101 acquires the current display size of the grid 202 (step S404). In this step, the system controller 101 acquires the display size of the grid 202 based on the width in an X direction or a Y direction or the size of an area in which the grid 202 is displayed.

Then, the system controller 101 determines whether or not the display size of the grid 202 is equal to or larger than a predetermined size which is a threshold value (step S405). If the display size of the grid 202 is equal to or larger than the predetermined size (YES to the step S405), the system controller 101 to a step S406, wherein the system controller 101 moves the marker 201 to the touch position where the touch-down operation has been performed to display the marker 201 thereat, and sets the white balance setting to a setting value corresponding to the position on the grid 202 where the marker 201 is displayed (i.e. the touch-down position).

The system controller 101 stores the white balance setting value in the nonvolatile memory 114, for use in performing white balancing on an image obtained through a photographing operation performed next time. In this case, the display position of the grid 202 is fixed, and the system controller 101 displays the marker 201 at the touch position, considering that the size of the grid 202 is sufficiently large and the user can accurately touch and designate a desired position on the grid 202.

Figure 5A:
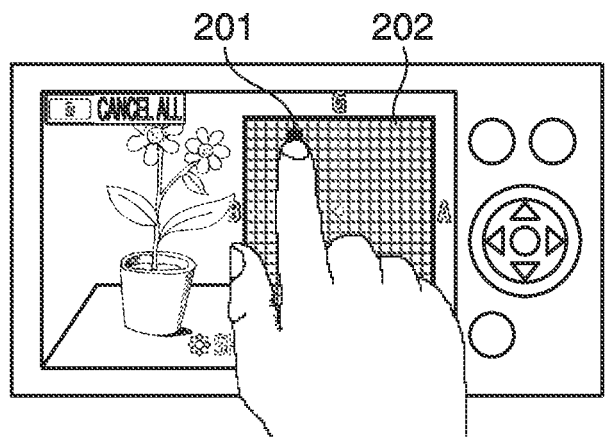
FIG. 5A is a diagram showing an operation for setting the marker on the camera.
Figure 5B:
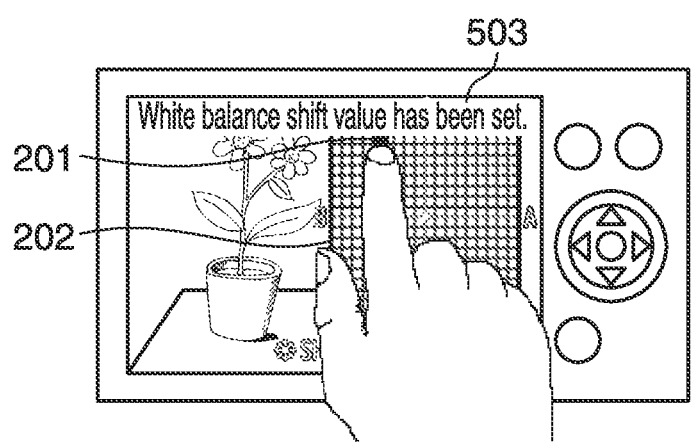
FIG. 5B is a diagram showing an example of the display of a guide message notifying that a white balance setting value has been set.
Figure 5C:
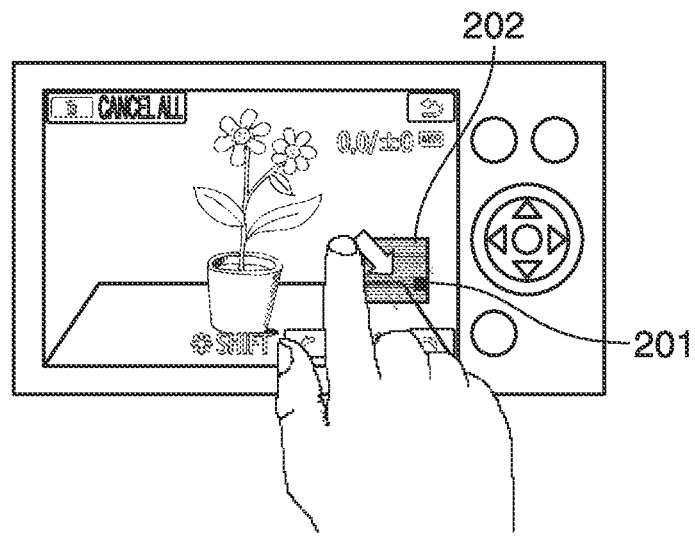
FIG. 5C is a diagram showing an operation for moving the grid.
Figure 5D:
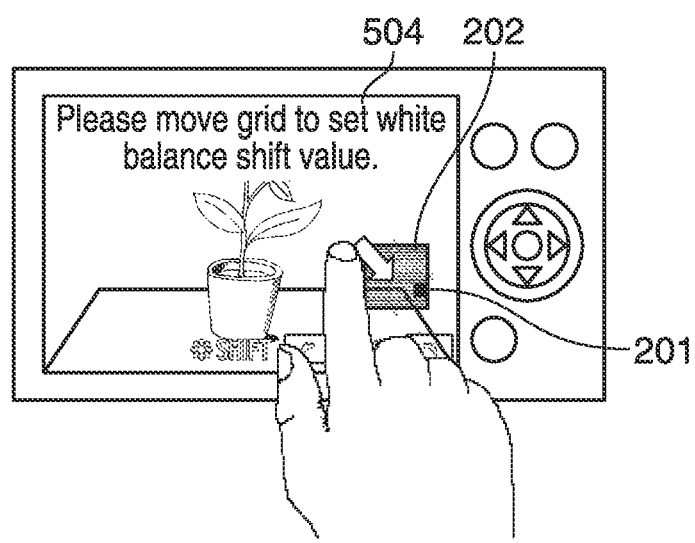
FIG. 5D is a diagram showing an example of the display of a guide message notifying that the grid can be moved.

FIGS. 5A to 5D are diagrams useful in explaining operations performed on the camera 100 shown in FIG. 1, for setting the marker 201 and moving the grid 202, in which FIG. 5A shows an operation for setting the marker 201, FIG. 5B shows an example of the display of a guide message notifying that a setting value has been set, FIG. 5C shows an operation for moving the grid 202, and FIG. 5D shows an example of the display of a guide message notifying that the grid 202 can be moved.

In the example shown in FIG. 5A, the grid 202 is large enough for the user to touch a cell of the grid with ease, and hence the system controller 101 sets the marker 201 at a position where the touch-down operation has been performed. At this time, as shown in FIG. 5B, the system controller 101 may display a guide message 503 indicating that the white balance setting value has been set based on the touch-down position.

Note that as will be described hereinafter, it is assumed, in the present example, that after the marker 201 is displayed on the touch-down position, the system controller 101 does not move the marker 201 even when a touch-move operation is performed. However, the system controller 101 may move the marker 201 when the touch-move operation is performed. In this case, the system controller 101 displays the marker 201 at a position where a touch-up operation is finally performed, and sets the white balance setting value to a setting value corresponding to the touch-up position.

If the display size of the grid 202 is smaller than the predetermined size (NO to the step S405), the system controller 101 fixedly displays the marker 201 without moving the same, and moves the display position of the grid 202 (display object) according to a touch-move operation following the touch-down operation (step S407).

In the example shown in FIG. 5C, the touch-move operation is being performed on the grid 202 in a direction indicated by a hollow arrow. If the display size of the grid 202 is smaller than the predetermined size, as in the case of the illustrated example, it is difficult for the user to touch a desired cell by the touch-down operation. To cope with this, as described above, the system controller 101 moves the grid 202 according to the touch-move operation in a state in which the marker 201 is fixed, to thereby change a relative positional relationship between the marker 201 and the grid 202.

In doing this, the user performs the touch-move operation (swiping operation) such that a desired cell on the grid 202 comes to the position where the marker 201 is fixed. In this swiping operation, differently from the FIG. 5A case where the marker 201 is moved to the touch-down position, the marker 201 is not moved to the position touched with the finger, but the grid 202 is moved according to the swiping operation. Therefore, the marker 201 is not hidden by the finger, and the user can visually confirm the marker 201. Therefore, the user can relatively move the marker 201 to the desired cell while visually confirming the position of the marker 201 with respect to the grid 202.

When the user finally performs the touch-up operation after the swiping operation, the system controller 101 finally determines the position of the marker 201 with respect to the grid 202. Therefore, the system controller 101 does not change the white balance setting value during execution of the touch-move operation.

Note that in the step S407, the system controller 101 may display a guide message 504 indicating that the user can move the grid 202 by a touch-move operation.

Then, the system controller 101 determines whether or not the touch-up operation is performed (step S408). If the touch-up operation is not performed (NO to the step S408), the system controller 101 returns to the step S407, and changes the display position of the grid 202 (display object) according to the touch-move operation (position change).

On the other hand, if the touch-up operation has been performed (YES to the step S408), the system controller 101 sets the white balance setting value to a setting value corresponding to the position of the marker 201 on the grid 202 which has been moved (step S409). Then, the system controller 101 stores the white balance setting value in the nonvolatile memory 114, for use in performing white balancing on an image obtained through a photographing operation performed next time.

After execution of the step S406 or S409, the system controller 101 determines whether or not the pinch-in or pinch-out operation has been performed (step S410). If the pinch-in or pinch-out operation has been performed (YES to the step S410), the system controller 101 increases or reduces the display size of the grid 202 (display object) according to the pinch-in or pinch-out operation (step S411: display size change).

Then, the system controller 101 determines whether or not a termination operation for terminating (operation for closing) the white balance setting screen has been performed (step S412). If the termination operation has been performed (YES to the step S412), the system controller 101 terminates the present marker designation operation process. On the other hand, if the termination operation has not been performed (NO to the step S412), the system controller 101 returns to the step S402, and determines whether or not a touch-down operation is detected.

Note that if neither the pinch-in operation nor the pinch-out operation has been performed (NO to the step S410), the system controller 101 directly proceeds to the step S412. Further, if it is determined in the step S402 that the touch-down operation is not detected (NO to the step S402), the system controller 101 directly proceeds to the step S410.

As described above, in the first embodiment, depending on the size of the grid 202, one of processing for moving the marker 201 to the touch position and processing for fixing the marker 201 and moving the grid 202 according to the touch-move operation is performed. This enables the user to intuitively and easily designate the touch position regardless of the size of the grid 202 which is the display object.

Next, a description will be given of a digital camera as an image pickup apparatus including a display controller according to a second embodiment of the present invention. The camera according to the second embodiment has the same configuration as the camera shown in FIG. 1. Therefore, the components of the camera 100 are designated by the same reference numerals, and description thereof is omitted.

Figure 6:
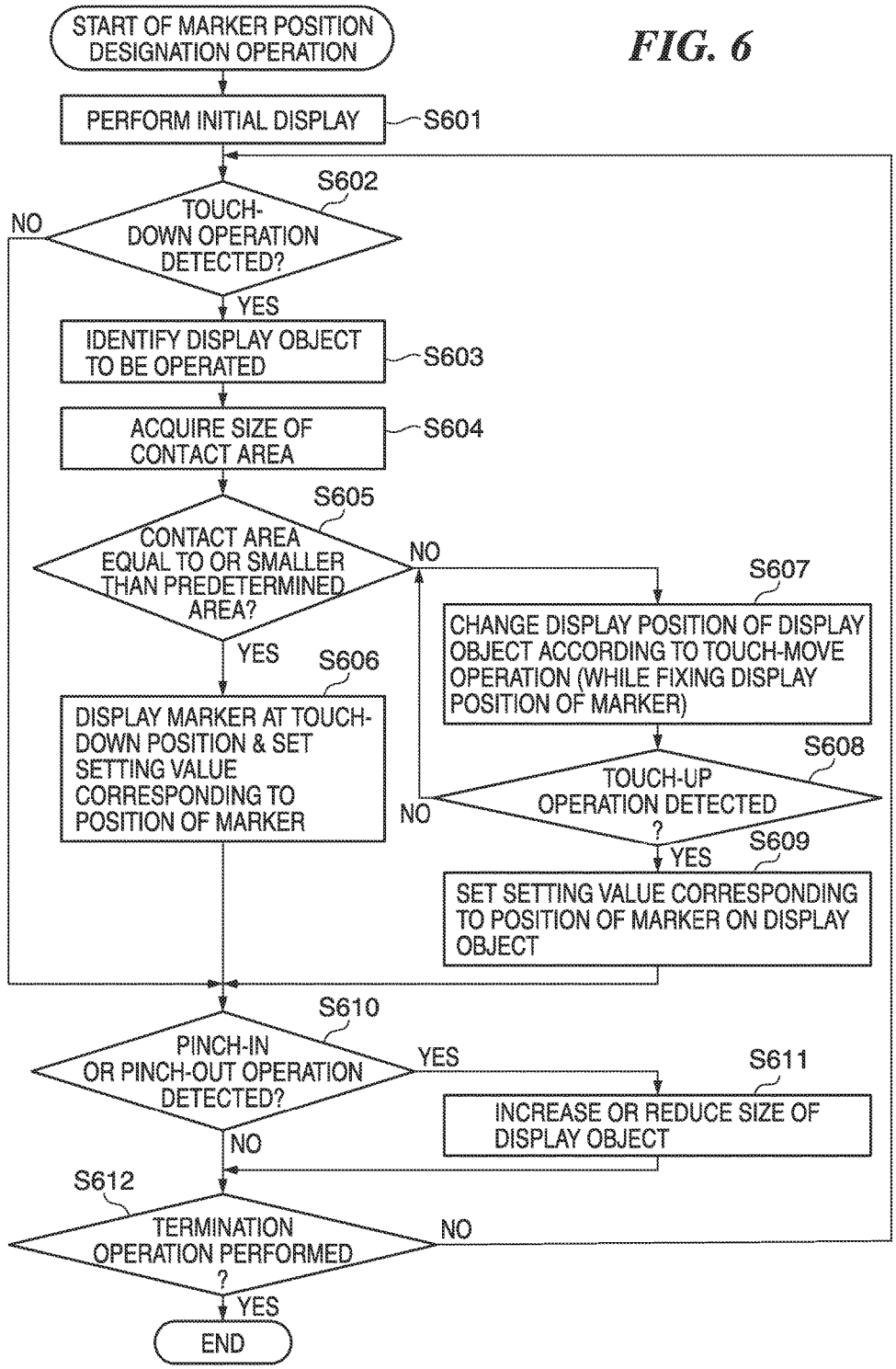
FIG. 6 is a flowchart of a marker position designation operation process for designating a position of a marker on a grid displayed on a display section of a digital camera as an image pickup apparatus including a display controller according to a second embodiment of the present invention.

FIG. 6 is a flowchart of a marker position designation operation process for designating a position of the marker 201 on the grid 202 displayed on the display section 111 of the camera according to the second embodiment.

Here, the description will be given, by taking the white balance setting as an example, of a case where the movement of the grid 202 and the movement of the marker 201 are selectively performed by a touch operation in a manner switched therebetween depending on a touch area. Further, the marker position designation operation process shown in FIG. 6 is performed by the system controller 101 that loads a program recorded in the nonvolatile memory 114 into the system memory 113 and executes the loaded program.

When the user starts the camera 100 in the photographing mode and performs an operation for causing the white balance setting screen to be displayed on the display section 111, the system controller 101 starts the marker position designation operation process in FIG. 6. Then, the system controller 101 executes steps S601 to S603. The steps S601 to S603 are the same as the steps S401 to S403 described with reference to FIG. 4.

After identifying, based on the touch position at which the touch-down operation has been performed, a display object to be operated, in the step S603, the system controller 101 acquires a touch area (contact area or input area) touched by the touch-down operation (step S604). Then, the system controller 101 determines whether or not the touch area is equal to or smaller than a predetermined area which is a threshold value (step S605). If the touch area is equal to or smaller than the predetermined area (YES to the step S605), the system controller 101 judges that the touch-down operation has been performed using a thing having a thin extremity, such as a touch pen, and proceeds to a step S606, wherein the system controller 101 moves the marker 201 to the touch position where the touch-down operation has been performed to display the marker 201 thereat, and sets the white balance setting value to a setting value corresponding to the position on the grid 202 where the marker 201 is displayed (i.e. the touch-down position).

The system controller 101 stores the white balance setting value in the nonvolatile memory 114, for use in performing white balancing on an image obtained through a photographing operation performed next time.

If the touch area is larger than the predetermined area (NO to the step S605), the system controller 101 judges that the touch-down operation has been performed using a thing having an extremity which is not thin, such as a finger, and proceeds to a step S607, wherein the system controller 101 fixedly displays the marker 201 without moving the same, and moves the display position of the grid 202 (display object) according to a touch-move operation following the touch-down operation Then, the system controller 101 executes steps S608 and S609. The steps S608 and S609 are the same as the steps S408 and S409 in FIG. 4.

After execution of the step S606 or S609, the system controller 101 executes steps S610 to S612. The steps S610 to S612 are the same as the steps S410 to S412 in FIG. 4. If it is determined in the step S612 that the termination operation has not been performed (NO to the step S612), the system controller 101 returns to the step S602. Further, if it is determined in the step S602 that the touch-down operation is not detected (NO to the step S602), the system controller 101 directly proceeds to the step S610.

In the example in FIG. 6, it is determined in the step S605 whether or not the touch area (contact area) is equal to or smaller than the predetermined area. However, the determination may be performed based on both of the contact area and the display size (display area) of the grid 202. For example, if a ratio of the contact area to the display size of the grid 202 is not higher than a predetermined ratio, the system controller 101 proceeds to the step S606. On the other hand, if the ratio of the contact area to the display size of the grid 202 is higher than the predetermined ratio, the system controller 101 proceeds to the step S607.

With this variation of the step S605, even when the display is touched with a thing having an extremity which is not thin, such as a finger, if the display size of the grid 202 is large, the user can touch a desired position on the grid 202. Therefore, it is possible to designate a position by the touch-down operation, and move the marker 201 to the designated position.

As described above, in the second embodiment, depending on the touch area, one of processing for moving the marker 201 to the touch position and processing for fixing the marker 201 and moving the grid 202 according to the touch-move operation is performed. This makes it possible to avoid a situation in which it is difficult to finely designate a position by a touch operation performed using a thing having a relatively large touch area, such as a finger. On the other hand, in a case where the touch operation is performed using a thing having a thin extremity, such as a touch pen, it is possible to finely designate a position by a touch-down operation. As a result, the user can intuitively and easily designate the touch position regardless of the size of the grid 202 which is the display object.

The control by the system controller 101 may be performed by one hardware unit, or the overall operation of the apparatus may be controlled by a plurality of hardware units sharing processing operations between them.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Further, although in the above-described embodiments, the case where the present invention is applied to the digital camera 100 is described, by way of example, this is not limitative, but the present invention can be applied to any other display controller insofar as it is configured to move a marker relative to a displayed position designation target, such as the grid 202. Further, the display object is not limited to the above-described grid, but the present invention can be applied to any other display object insofar as it is a position designation target on which a position can be designated by a touch operation. For example, the present invention can be applied to cases where any of positions, such as a start point and an end point for designating a range, and a drawing point, is designated on the position designation target, such as an image, a figure, or a document.

Further, the present invention can also be applied to a case where positions, such as a start point and an arrival point for guiding a route, are designated on the position designation target, such as a map.

Further, although in the above-described embodiments, an operation for designating a position by a touch operation is described, the present invention can be applied to an operation for designating a position using any of other suitable pointing devices, such as a mouse. For example, also when designating a position on a grid using a mouse pointer, if the grid is small, it is difficult to point to a desired position. In this case, as described in the first embodiment, it is only required to fix the display position of a marker, and move the grid by mouse dragging with respect to the marker which is fixedly displayed.

Further, when drawing an image on a drawing object which is a position designation target, using a mouse, if a line width set for drawing (i.e. an area drawn at one time) is large, it is difficult to point to a desired position. In this case, as described in the second embodiment, the drawing object may be moved by mouse dragging with respect to the marker which is fixedly displayed (drawing point).

This applies to a case where a pointing device other than the mouse is used. That is, the present invention can be applied to a personal computer, a PDA, a mobile phone terminal, a portable image viewer, a printer apparatus provided with a display, a digital photo frame, a game player, an electronic book reader, and so forth.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2015-119067 filed Jun. 12, 2015, which is hereby incorporated by reference herein in its entirety.

What is claimed is:

1. A display controller comprising:
   an input device configured to receive an input of a position to a display screen;
   at least one processor; and
   a memory storing instructions that, when executed by the at least one processor, cause the at least one processor to:
   cause a position designation target and a marker that designates a position on the position designation target to be displayed on the display screen;
   in a case where a display size of the position designation target is larger than a predetermined size, when the input of the position to the display screen is received by said input device, change a display position of the marker according to the input of the position, in a state in which a display position of the position designation target is fixed, and in a case where the display size of the position designation target is smaller than the predetermined size, when the input of the position to the display screen is received by said input device, change the display position of the position designation target according to the input of the position, in a state in which a display position of the marker is fixed; and
   perform processing corresponding to the position of the marker with respect to the position designation target, which has been changed by said at least one processor.

2. The display controller according to claim 1, wherein the memory further stores instructions which cause the at least one processor to change the display size of the position designation target when a predetermined operation is performed on the display screen.

3. The display controller according to claim 2, wherein the predetermined operation is an operation performed by a user.

4. The display controller according to claim 1, wherein the position designation target is a grid having a plurality of cells.

5. The display controller according to claim 4, wherein the grid is a grid for performing white balance setting, and said at least one processor performs white balancing according to a white balance setting value corresponding to the position of the marker.

6. The display controller according to claim 1, wherein the position designation target is one of images, figures, documents, and maps.

7. The display controller according to claim 1, wherein the marker is a marker for designating any of a start point and an end point in designating a range, and a drawing point.

8. The display controller according to claim 7, wherein the position designation target is a map, and the marker is a marker for designating at least one of a start point and an arrival point for guiding a route on the map.

9. The display controller according to claim 1, wherein when said at least one processor changes the display position of the marker or the display position of the position designation target, said at least one processor performs notification thereof.

10. The display controller according to claim 1, wherein a touch panel or a mouse for operating a pointer that moves on the display screen is used as said input device.

11. The display controller according to claim 1, further comprising an image sensor and a display.

12. A display controller comprising:
an input device configured to receive an input of a position to a display screen;
at least one processor; and
a memory storing instructions that, when executed by the at least one processor, cause the processor to:
cause a position designation target and a marker that designates a position on the position designation target to be displayed on the display screen;
in a case where a state of the input of the position received by said input device is a predetermined state, change a display position of the marker according to the input of the position, in a state in which a display position of the position designation target is fixed, and in a case where the state of the input of the position received by said input device is not the predetermined state, change the display position of the position designation target according to the input of the position, in a state in which a display position of the marker is fixed; and
perform processing corresponding to the position of the marker with respect to the position designation target, which has been changed by said at least one processor.

13. The display controller according to claim 12, wherein said at least one processor changes, in a case where an input area of the input of the position received by said input device is smaller than a predetermined area, the display position of the marker according to the input of the position, in the state in which the display position of the position designation target is fixed, and changes, in a case where the input area of the input of the position received by said input device is larger than the predetermined area, the display position of the position designation target according to the input of the position, in the state in which the display position of the marker is fixed.

14. The display controller according to claim 12, wherein said at least one processor changes, in a case where a ratio of an input area of the input of the position received by said input device to a display area of the position designation target is smaller than a predetermined ratio, the display position of the marker according to the input of the position, in the state in which the display position of the position designation target is fixed, and changes, in a case where the ratio of the input area of the input of the position received by said input device to the display area of the position designation target is larger than the predetermined ratio, the display position of the position designation target according to the input of the position, in the state in which the display position of the marker is fixed.

15. A method of controlling a display controller that causes a position designation target and a marker that designates a position on the position designation target to be displayed on a display screen, comprising:
receiving an input of a position to the display screen;
causing the position designation target and the marker to be displayed on the display screen;
changing, in a case where a display size of the position designation target is larger than a predetermined size, when the input of the position to the display screen is received by said receiving, a display position of the marker according to the input of the position, in a state in which a display position of the position designation target is fixed, and in a case where the display size of the position designation target is smaller than the predetermined size, when the input of the position to the display screen is received by said receiving, the display position of the position designation target according to the input of the position, in a state in which a display position of the marker is fixed; and
performing processing corresponding to the position of the marker with respect to the position designation target, which has been changed by said changing.

16. A non-transitory computer-readable storage medium storing a computer-executable program for causing a computer to execute a method of controlling a display controller that causes a position designation target and a marker that designates a position on the position designation target to be displayed on a display screen,
wherein the method comprises:
receiving an input of a position to the display screen;
causing the position designation target and the marker to be displayed on the display screen;
changing, in a case where a display size of the position designation target is larger than a predetermined size, when the input of the position to the display screen is received by said receiving, a display position of the marker according to the input of the position, in a state in which a display position of the position designation target is fixed, and in a case where the display size of the position designation target is smaller than the predetermined size, when the input of the position to the display screen is received by said receiving, the display position of the position designation target according to the input of the position, in a state in which a display position of the marker is fixed; and
performing processing corresponding to the position of the marker with respect to the position designation target, which has been changed by said changing.

* * * * *